United States Patent
Okada

(10) Patent No.: US 9,616,410 B2
(45) Date of Patent: Apr. 11, 2017

(54) EXHAUST GAS PURIFYING CATALYST

(71) Applicant: CATALER CORPORATION, Kakegawa-shi, Shizuoka (JP)

(72) Inventor: Mitsuyoshi Okada, Kakegawa (JP)

(73) Assignee: Cataler Corporation, Kakegawa-shi, Shizuoka (JP)

( * ) Notice: Subject to any disclaimer, the term of this patent is extended or adjusted under 35 U.S.C. 154(b) by 0 days.

(21) Appl. No.: 14/903,419

(22) PCT Filed: Jul. 10, 2014

(86) PCT No.: PCT/JP2014/068423
§ 371 (c)(1),
(2) Date: Jan. 7, 2016

(87) PCT Pub. No.: WO2015/005423
PCT Pub. Date: Jan. 15, 2015

(65) Prior Publication Data
US 2016/0151764 A1    Jun. 2, 2016

(30) Foreign Application Priority Data
Jul. 10, 2013  (JP) ................ 2013-144858

(51) Int. Cl.
*B01J 23/00* (2006.01)
*B01J 23/648* (2006.01)
*B01D 53/94* (2006.01)
*F01N 3/28* (2006.01)
*B01J 35/00* (2006.01)
(Continued)

(52) U.S. Cl.
CPC ........ *B01J 23/6482* (2013.01); *B01D 53/945* (2013.01); *B01J 23/22* (2013.01); *B01J 23/464* (2013.01); *B01J 23/63* (2013.01); *B01J 35/0006* (2013.01); *B01J 35/04* (2013.01); *F01N 3/2807* (2013.01); *B01D 2255/1021* (2013.01); *B01D 2255/1023* (2013.01); *B01D 2255/207* (2013.01); *B01D 2255/20723* (2013.01); *B01D 2255/9032* (2013.01); *Y02T 10/22* (2013.01)

(58) Field of Classification Search
USPC ........................................ 502/325
See application file for complete search history.

(56) References Cited

U.S. PATENT DOCUMENTS 5,157,007 A    10/1992 Domesle et al.
2009/0196811 A1    8/2009 Yamashita et al.
(Continued)

FOREIGN PATENT DOCUMENTS

JP    3-224631    10/1991
JP    8-257405    10/1996
(Continued)

*Primary Examiner* — Colleen Dunn
*Assistant Examiner* — Haytham Soliman
(74) *Attorney, Agent, or Firm* — Finnegan, Henderson, Farabow, Garrett & Dunner, LLP

(57) ABSTRACT

The object of the present invention is to provide an exhaust gas purifying catalyst, exhibits excellent performance for methane purification. The object can be solved by the exhaust gas purifying catalyst comprising a substrate and a catalyst layer provided on the substrate, in which the catalyst layer comprises at least one member selected from the group consisting of vanadium, niobium and tantalum; and platinum, and/or palladium.

4 Claims, 8 Drawing Sheets

(51) Int. Cl.
    *B01J 23/22*     (2006.01)
    *B01J 23/63*     (2006.01)
    *B01J 23/46*     (2006.01)
    *B01J 35/04*     (2006.01)

(56) References Cited

U.S. PATENT DOCUMENTS

| | | | |
|---|---|---|---|
| 2012/0040824 A1 | 2/2012 | Itou et al. | |
| 2012/0128557 A1* | 5/2012 | Nunan | B01D 53/945 423/213.5 |
| 2013/0029838 A1* | 1/2013 | Aoki | B01D 53/945 502/304 |

FOREIGN PATENT DOCUMENTS

| | | |
|---|---|---|
| JP | 2007-130624 | 5/2007 |
| JP | 2007-313486 | 12/2007 |
| JP | 2008-238069 | 10/2008 |
| JP | 2010-253447 | 11/2010 |

* cited by examiner

EXHAUST GAS PURIFYING CATALYST

CROSS-REFERENCE TO RELATED APPLICATIONS

This application is a national phase application of International Application No, PCT/JP2014/068423, filed Jul. 10, 2014, which claims the benefit of Japanese Application No. 2013-144858, filed Jul. 10, 2013, the contents of both of which are incorporated herein by reference.

TECHNICAL FIELD

The present invention relates to an exhaust gas purifying catalyst.

BACKGROUND ART

Exhaust gas emitted from internal combustion engines such as vehicle engines contains harmful substances, such as hydrocarbons (HC) carbon monoxide (CO), and nitrogen oxides (NOx). Since such substances cause air pollution, purification of exhaust gas is necessary.

Exhaust gas can be purified using exhaust gas purifying catalysts. In general, exhaust gas purifying catalysts are composed of a substrate and a catalyst layer provided on the substrate. Such catalyst layer comprises a carrier and a catalyst metal supported on the carrier. Noble metals such as platinum, palladium, and rhodium are commonly used as catalyst metals.

Metals other than noble metals can also be used as catalyst metals. For example, Patent Document 1 discloses a NOx purifying catalyst using vanadium, niobium, tantalum, or tin as a catalyst metal.

PRIOR ART DOCUMENTS

Patent Documents

Patent Document 1: JP Patent Publication (Kokai) No. 2008-238069 A

SUMMARY OF THE INVENTION

Problem to Be Solved by the Invention

In recent years, a reduction of the amount of noble metals used has been attempted for the purpose of cost reduction. Also, the use of palladium as a replacement for platinum has been attempted from the viewpoint of cost reduction. In cases of such design modifications, a catalyst is reconstituted so as not to increase the total amount of harmful substances emitted.

When the amount of platinum excellent in the purification of paraffin (in particular, methane) is decreased, however, the proportion of methane relative to the entirety of hydrocarbons emitted is disadvantageously increased, At present, exhaust gas regulatory levels are determined on the basis of hydrocarbons other than methane in general. In the future, however, regulatory levels may be set for methane.

Accordingly, it is an object of the present invention to provide an exhaust gas purifying catalyst, exhibits excellent performance for methane purification.

Means for Solving the Problem

The present inventors have studied and discovered that methane included in an exhaust gas could be efficiently purified by using vanadium, niobium, or tantalum.

Specifically, the present invention includes the following.

(1) An exhaust gas purifying catalyst comprising a substrate and a catalyst layer provided on the substrate, wherein the catalyst layer comprises at least one member selected from the group consisting of vanadium, niobium and tantalum; and platinum and/or palladium.

(2) The exhaust gas purifying catalyst according to (1), wherein
the catalyst layer comprises a lower catalyst layer comprising an upstream catalyst layer and a downstream catalyst layer,
the upstream catalyst layer is located on an upstream side of the downstream catalyst layer in terms of the exhaust gas flow direction,
the upstream catalyst layer comprises platinum and/or palladium, and
the downstream catalyst layer comprises at least one member selected from the group consisting of vanadium, niobium and tantalum.

(3) The exhaust gas purifying catalyst according to (2), wherein
the catalyst layer further comprises an upper catalyst layer provided on the lower catalyst layer, and
the upper catalyst layer comprises rhodium.

(4) The exhaust gas purifying catalyst according to (1), wherein the catalyst layer further comprises rhodium.

(5) The exhaust gas purifying catalyst according to (4), wherein
the catalyst layer comprises a lower catalyst layer provided on the substrate, and an upper catalyst layer provided on the lower catalyst layer,
the lower catalyst layer comprises at least one member selected from the group consisting of vanadium, niobium and tantalum; and platinum and/or palladium, and
the upper catalyst layer comprises rhodium.

This specification incorporates the content of the specification and/or drawings of Japanese Patent Application No. 2013-144858, for which priority is claimed to the present application.

Effects of the Invention

According to the present invention, an exhaust gas purifying catalyst excellent in methane purification can be provided.

EMBODIMENTS FOR CARRYING OUT THE INVENTION

Figure 1:
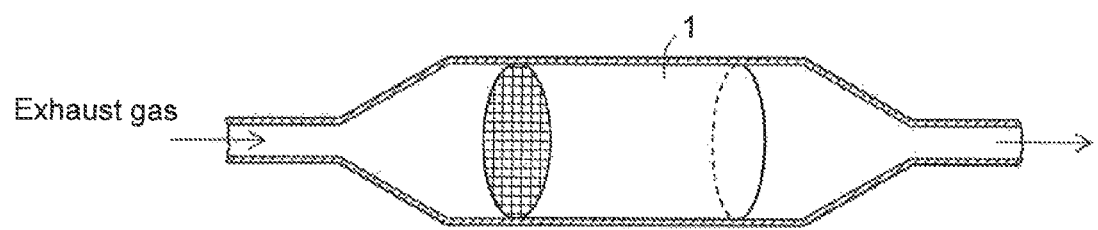
FIG. 1 shows an embodiment of an exhaust gas purifying catalyst.
Figure 2:
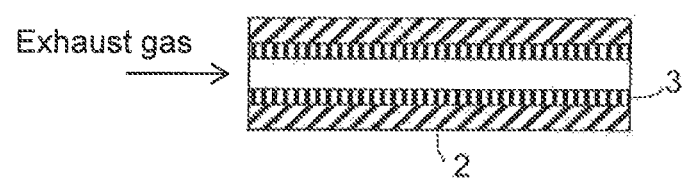
FIG. 2 shows a part of a cross-sectional view of an exhaust gas purifying catalyst.

Hereafter, the present invention is described in detail.
The present invention relates to an exhaust gas purifying catalyst comprising a substrate and a catalyst layer provided on the substrate, in which the catalyst layer comprises at least one member selected from the group consisting of vanadium, niobium and tantalum; and platinum and/or palladium (e.g., FIGS. 1 and 2).

Since the exhaust gas purifying catalyst of the present invention contains vanadium, niobium, or tantalum which are excellent in the purification of paraffin (in particular, methane), it can efficiently purify methane included in an exhaust gas. The type of an exhaust gas to be purified is not particularly limited. For example, an exhaust gas emitted from a gasoline engine and an exhaust gas emitted from a diesel engine can both be purified.

The valences of vanadium, niobium and tantalum vary extensively in a range from 2 to 5, and thereby they can oxidize hydrocarbons including methane. For example, methane can be oxidized by pentavalent vanadium, other paraffins can be oxidized by trivalent vanadium, and olefin can be oxidized by quadrivalent vanadium.

Substrates that are generally used for catalysts for exhaust gas purification can be used for the exhaust gas purifying catalyst of the present invention. For example, straight flow type or wall-flow type monolith substrates can be used. Substrate materials are not particularly limited, and examples thereof include ceramics, silicon carbide, and metals.

A catalyst layer provided on a substrate comprises, as catalyst metals, at least one member selected from the group consisting of vanadium, niobium and tantalum; and platinum and/or palladium. Vanadium, niobium and tantalum are capable of efficient purification of paraffin (in particular, methane). On the other hand, platinum and palladium are capable of efficient purification of olefin. By comprising such catalyst metals, accordingly, total hydrocarbons (THC) can be efficiently purified.

A catalyst layer may further comprise rhodium as a catalyst metal. By comprising rhodium, NOx can also be purified.

The total content of vanadium, niobium and tantalum is preferably 0.25 to 1.5 g, more preferably 0.5 to 1.25 g, and particularly preferably 0.75 to 1.0 g, per liter of the substrate, though it is not particularly limited. Paraffins (in particular, methan) can be efficiently purified thereby.

The total content of platinum and palladium is preferably 0.1 to 1.5 g, more preferably 0.3 to 1 g, and particularly preferably 0.5 to 0.8 g, per liter of the substrate, though it is not particularly limited. Olefins can be efficiently purified thereby.

The content of rhodium is preferably 0.05 to 1 g, more preferably 0.1 to 0.7 g, and particularly preferably 0.2 to 0.5 g, per liter of the substrate, though it is not particularly limited. NOx can be efficiently purified thereby.

It is preferable that a catalyst metal be supported on a support. A plurality of types of catalyst metals may be supported on a same support or on different supports. In order to inhibit catalyst metals from forming alloys, it is preferable that catalyst metals be supported on different supports.

Examples of supports include alumina, titania, silica, and zirconia supports. A material having oxygen storage/release capacity (hereafter referred to as an "OSC material") can also be used for a support. Examples of OSC materials include cerie, a cerium-zirconium composite oxide, and a composite oxide of cerium, zirconium, and at least one member selected from the group consisting of hafnium, neodymium, yttrium, lanthanum, praseodymium, and nickel.

An OSC material which does not carry a catalyst metal may be present in a catalyst layer. By an existence of OSC material in a catalyst layer, the oxygen level in the vicinity of the catalyst metal is regulated and the efficiency of exhaust gas purification is improved.

Figure 3:
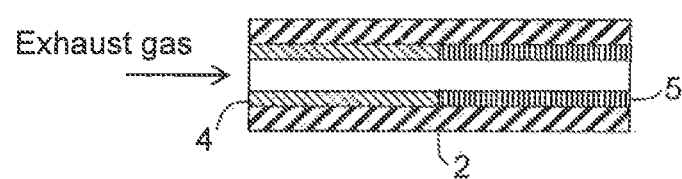
FIG. 3 shows a part of a cross-sectional view of an exhaust gas purifying catalyst.

A catalyst layer may be composed of a plurality of layers. For example, as shown in FIG. 3, a catalyst layer may comprise an upstream catalyst layer 4 and a downstream catalyst layer 5 provided on the substrate 2 in which the downstream catalyst layer 5 is located on a downstream side of the upstream catalyst layer. The upstream catalyst layer and the downstream catalyst layer may be provided with or without gaps therebetween on the same substrate. Alternatively, such catalyst layer may be provided in areas throughout the entire substrate or on a part of the substrate.

In the structure shown in FIG. 3, it is preferable that the upstream catalyst layer comprise platinum and/or palladium, and the downstream catalyst layer comprise at least one member selected from the group consisting of vanadium, niobium and tantalum (in particular, vanadium). It is particularly preferable that the upstream catalyst layer exclusively comprise, as catalyst metals, platinum and/or palladium. It is particularly preferable that the downstream catalyst layer exclusively comprise, as catalyst metals, at least one member selected from the group consisting of vanadium, niobium and tantalum (particularly, vanadium). It is particularly preferable that at least one member selected from the group consisting of vanadium, niobium and tantalum (in particular, vanadium) are contained only in the downstream catalyst layer. By providing such structure, olefin can be purified by the upstream catalyst layer and paraffin (in particular, methane) can be purified by the downstream catalyst layer. Though methane is generated secondarily as a result of olefin purification by the upstream catalyst layer, such methane can also be purified by the downstream catalyst layer.

Figure 4:
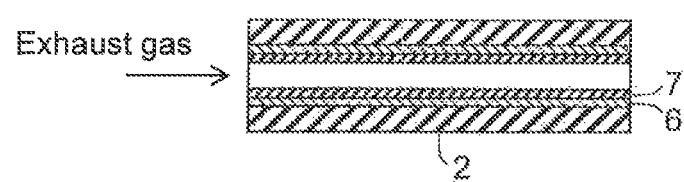
FIG. 4 shows a part of a cross-sectional view of an exhaust gas purifying catalyst.

For example, as shown in FIG. 4, the catalyst layer may comprise a lower catalyst layer 6 provided on the substrate 2, and an upper catalyst layer 7 provided on the lower catalyst layer. The upper catalyst layer may be provided in areas throughout the entire lower catalyst layer or in a part of the lower catalyst layer.

In the structure shown in FIG. 4, it is preferable that the lower catalyst layer comprise at least one member selected from the group consisting of vanadium, niobium and tantalum (in particular, vanadium); and platinum and/or palladium, and the upper catalyst layer comprise rhodium. It is particularly preferable that the lower catalyst layer exclusively comprise, as catalyst metals, at least one member selected from the group consisting of vanadium, niobium and tantalum (in particular, vanadium); and platinum and/or palladium. It is particularly preferable that the upper catalyst layer exclusively comprise, as a catalyst metal, rhodium. It is particularly preferable that at least one member selected from the group consisting of vanadium, niobium and tantalum (in particular, vanadium) is contained only in the lower catalyst layer. By providing such structure, olefin and paraffin (in particular, methane) can be purified by the lower catalyst layer, and NOx can be purified by the upper catalyst layer.

Figure 5:
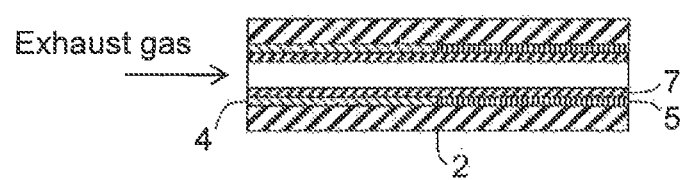
FIG. 5 shows a part of a cross-sectional view of an exhaust gas purifying catalyst.

For example, as shown in FIG. 5, the catalyst layer may be composed of a lower catalyst layer comprising an upstream catalyst layer 4 and a downstream catalyst layer 5 provided on the substrate 2 in which the downstream catalyst layer 5 is located on a downstream side of the upstream catalyst layer in terms of the exhaust gas flow direction, and an upper catalyst layer 7 provided on the lower catalyst layer. The upper catalyst layer may be provided in areas throughout the entire lower catalyst layer or in a part of the catalyst layer.

In the structure shown in FIG. 5, it is preferable that the upstream catalyst layer comprise platinum and/or palladium, the downstream catalyst layer comprise at least one member selected from the group consisting of vanadium, niobium and tantalum (in particular, vanadium), and the upper catalyst layer comprise rhodium. It is particularly preferable that the upstream catalyst layer exclusively comprise, as catalyst metals, platinum and/or palladium. It is particularly preferable that the downstream catalyst layer exclusively comprise, as catalyst metals, at least one member selected from the group consisting of vanadium, niobium and tantalum (in particular, vanadium). It is particularly preferable that the upper catalyst layer exclusively comprise, as a catalyst metal, rhodium. It is particularly preferable that at least one member selected from the group consisting of vanadium, niobium and tantalum (in particular, vanadium) are contained only in the downstream catalyst layer. By providing such structure, olefin can be purified by the upstream catalyst layer, paraffin (in particular, methane) that is originally contained in an exhaust gas and methane that is secondarily generated can be purified by the downstream catalyst layer, and NOx can be purified with the upper catalyst layer.

When the catalyst layer comprises an upstream catalyst layer and a downstream catalyst layer, the ratio of the length of the upstream catalyst layer to the length of the downstream catalyst layer in the axis direction of the substrate is preferably 9:1 to 4:6, more preferably 8:2 to 5:5, and particularly preferably 7:3 to 6:4, though it is not particularly limited. By setting such range of ratio, paraffin (in particular, methane) and NOx can be purified in a well-balanced manner.

In the downstream catalyst layer, the ratio of the total weight of vanadium, niobium and tantalum to the weight of the support is preferably 0.01 to 0.1:1, and more preferably 0.03 to 0.08:1, though it is not particularly limited, By setting such range of ratio, paraffin (in particular, methane) and NOx can be purified in a well-balanced manner.

In the downstream catalyst layer, the weight ratio of the OSC material to the support is preferably 0.05 to 0.3:1, and more preferably 0.1 to 0.2:1, though it is not particularly limited. By setting such range of ratio, paraffin (in particular, methane) and NOx can be purified in a well-balanced manner.

When the OSC material in the downstream catalyst layer comprises cerium, the molar ratio of cerium to the total of vanadium, niobium and tantalum is preferably 1:0.05 to 3.5, and more preferably 1:0.05 to 0.5, though it is not particularly limited. By setting such range of ratio, paraffin (in particular, methane) and NOx can be purified in a well-balanced manner.

Preferable embodiments of the present invention include an exhaust gas purifying catalyst comprises:

a substrate, a lower catalyst layer provided on the substrate, and an upper catalyst layer provided on the lower catalyst layer; in which the lower catalyst layer comprises an upstream catalyst layer and a downstream catalyst layer, in which the upstream catalyst layer is located on an upstream side of the downstream catalyst layer in terms of the exhaust gas flow direction;

the upstream catalyst layer comprises a first support, platinum and/or palladium carried on the first support, and a first OSC material;

the downstream catalyst layer comprises a second support, at least one member selected from the group consisting of vanadium, niobium and tantalum (in particular, vanadium) carried on the second support, and a second OSC material; and the upper catalyst layer comprises a third support, rhodium carried on the third support, and a third OSC material.

In this embodiment, it is preferable that the upstream catalyst layer exclusively comprise, as catalyst metals, platinum and/or palladium, the downstream catalyst layer exclusively comprise, as catalyst metals, at least one member selected from the group consisting of vanadium, niobium and tantalum (in particular, vanadium), and the upper catalyst layer exclusively comprise, as a catalyst metal, rhodium. In this embodiment, the first, second and third supports may be the same or different. In addition, the first, second and OSC materials may be the same or different.

EXAMPLES

Hereafter, the present invention is described in detail with reference to the examples and comparative examples, although the technical scope of the present invention is not limited thereto.

<Preparation of Exhaust Gas Purifying Catalyst>

Example 1

(1) A platinum nitrate solution, a cerium-zirconium composite oxide (an OSC material) ($Ce_2O$ content: 30%), alumina, and an alumina binder were mixed to obtain a slurry for upstream catalyst layer [1-1].

(2) Alumina was added and mixed with a solution of vanadyl oxalate (IV) (n-hydrate). The mixture was dehydrated and thermally treated to obtain a vanadium-supporting material ($V_2O_5$/alumina). The vanadium-supporting material, a cerium-zirconium composite oxide (an OSC material) ($Ce_2O$ content: 30%), and an alumina binder were mixed to obtain a slurry for downstream catalyst layer [1-2].

(3) A rhodium nitrate solution, a cerium-zirconium composite oxide (an OSC material) ($Ce_2O$ content: 30%), alumina, and an alumina binder were mixed to obtain a slurry for upper catalyst layer [1-3].

(4) An upstream catalyst layer is formed by application of the slurry for upstream catalyst layer [1-1] within a region from the end of the exhaust gas introduction side of the substrate to a site of 70% length in the axial direction from the end, followed by a thermal treatment. Subsequently, the downstream catalyst layer is formed by application of the slurry for downstream catalyst layer [1-2] within a region from the end of the exhaust gas emission side of the substrate to a site of 30% length in the axial direction from the end, followed by a thermal treatment. Subsequently, an upper catalyst layer is formed by application of the slurry for upper catalyst layer [1-3] on the upstream catalyst layer and the downstream catalyst layer, followed by a thermal treatment. Thus, an exhaust gas purifying catalyst was obtained.

The upstream catalyst layer is comprised of 0.6 g of platinum, 50 g of the OSC material, and 30 g of alumina per liter of the substrate.

The downstream catalyst layer is comprised of 2.5 g of $V_2O_5$, 10 g of the OSC material, and 50 g of alumina per liter of the substrate.

The upper catalyst layer is comprised 0.3 g of rhodium, 30 g of the OSC material, and 30 g of alumina per liter of the substrate.

Examples 2-1 to 2-4 and Comparative Example 1

Exhaust gas purification catalysts were obtained in the same manner as in Example 1, except that the amounts of $V_2O_5$ were modified to various levels.

Examples 3-1 to 3-6

Exhaust gas purification catalysts were obtained in the same manner as in Example 1, except that the amounts of OSC material in the downstream catalyst layer were modified to various levels.

Examples 4-1 to 4-4 and Comparative Example 2

Exhaust gas purification catalysts were obtained in the same manner as in Example 1, except that the ratios of the lengths of the upstream catalyst layers to the lengths of the downstream catalyst layers were modified to various extents.

<Purification Performance Test>

Figure 6:
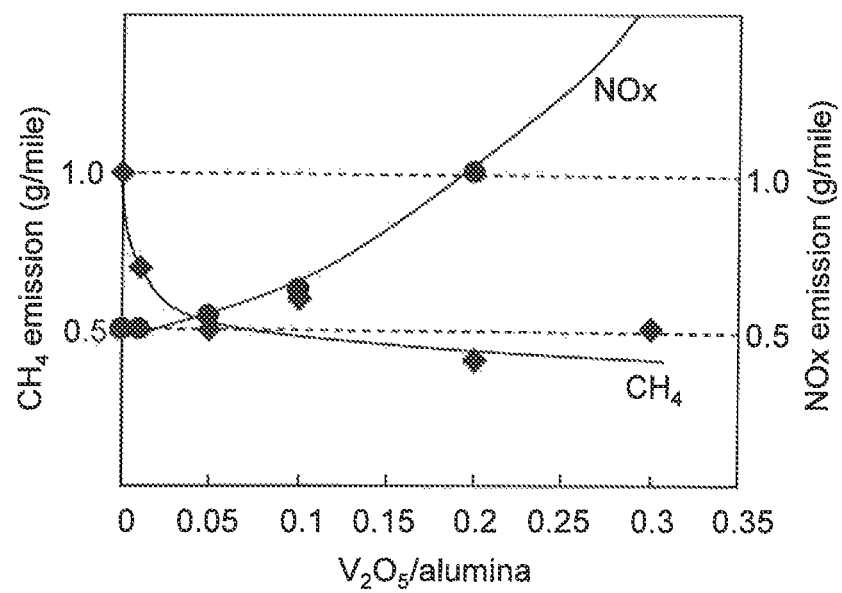
FIG. 6 shows the correlation between the ratio of $V_2O_5$ to alumina in the downstream catalyst layer and purification performance.
Figure 7:
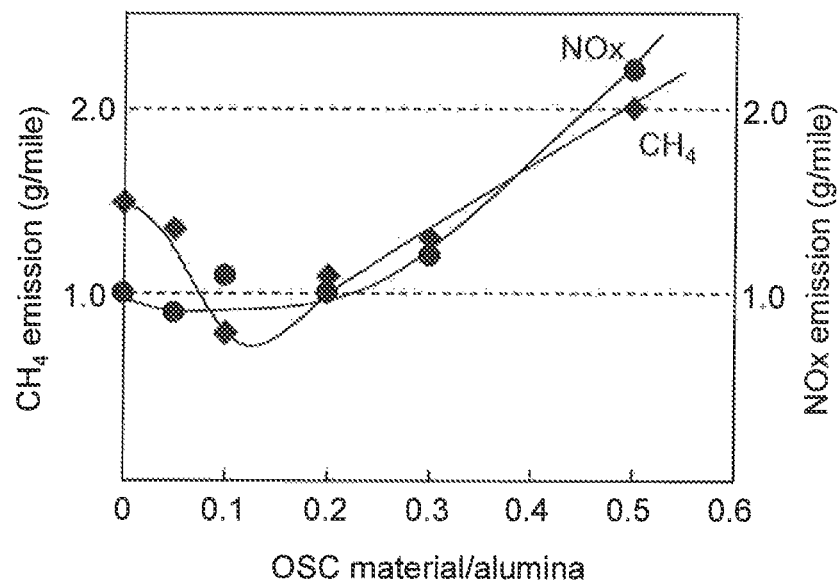
FIG. 7 shows the correlation between the ratio of OSC material to alumina in the downstream catalyst layer and purification performance.
Figure 8:
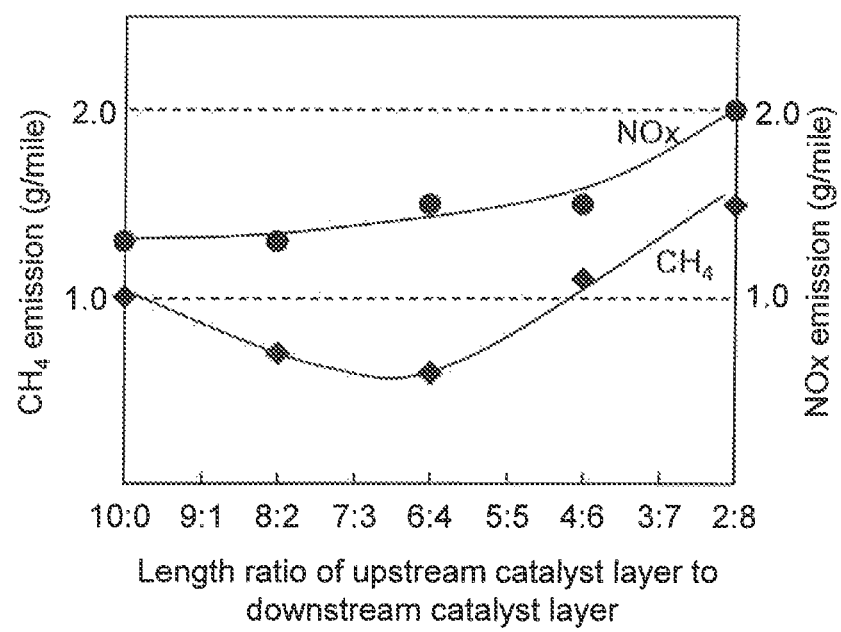
FIG. 8 shows the correlation between the length ratio of the upstream catalyst layer to the downstream catalyst layer and purification performance.

The exhaust gas purifying catalysts prepared in the examples and in the comparative examples above were subjected to durability tests with an engine of 4.3 L displacement at a catalyst bed temperature of 950° C. for 50 hours. Thereafter, the catalysts were mounted on real vehicles with an engine of 2.2 L displacement, and the amounts of THC (total hydrocarbons), $CH_4$, and NOx emissions were determined during the LA#4 mode driving. The results are shown in Table 1 and FIGS. 6 to 8.

TABLE 1

| | Downstream*[1] $V_2O_5$:OSC material:Al*[2] | Upstream:Downstream*[3] | TCH (g/mile) | $CH_4$ (g/mile) | NOx (g/mile) |
|---|---|---|---|---|---|
| Example 1 | 0.05:0.2:1 | 7:3 | 1.0 | 0.5 | 0.55 |
| Comparative Example 1 | 0:0.2:1 | 7:3 | 1.5 | 1.0 | 0.5 |
| Example 2-1 | 0.01:0.2:1 | 7:3 | 1.2 | 0.7 | 0.5 |
| Example 2-2 | 0.1:0.2:1 | 7:3 | 1.1 | 0.6 | 0.65 |
| Example 2-3 | 0.2:0.2:1 | 7:3 | 0.9 | 0.4 | 1.0 |
| Example 2-4 | 0.3:0.2:1 | 7:3 | 1.0 | 0.5 | — |
| Example 3-1 | 0.25:0:1 | 7:3 | 2.0 | 1.5 | 1.0 |
| Example 3-2 | 0.25:0.05:1 | 7:3 | 1.85 | 1.35 | 0.9 |
| Example 3-3 | 0.25:0.1:1 | 7:3 | 1.3 | 0.8 | 1.1 |
| Example 3-4 | 0.25:0.2:1 | 7:3 | 1.6 | 1.1 | 1.0 |
| Example 3-5 | 0.25:0.3:1 | 7:3 | 1.8 | 1.3 | 1.2 |
| Example 3-6 | 0.25:0.5:1 | 7:3 | 2.5 | 2.0 | 2.2 |
| Comparative Example 2 | — | 10:0 | 1.5 | 1.0 | 1.3 |
| Example 4-1 | 0.25:0.4:1 | 8:2 | 1.2 | 0.7 | 1.3 |
| Example 4-2 | 0.25:0.4:1 | 6:4 | 1.1 | 0.6 | 1.5 |
| Example 4-3 | 0.25:0.4:1 | 4:6 | 1.6 | 1.1 | 1.5 |
| Example 4-4 | 0.25:0.4:1 | 2:8 | 2.0 | 1.5 | 2.0 |

*[1]Downstream catalyst layer;
*[2]alumina;
*[3]the ratio of the length of the upstream catalyst layer to that of the downstream catalyst layer When vanadium, niobium, or tantalum is present other than the downstream catalyst layer, the purification performance tends to be inferior to that of the above examples.

DESCRIPTION OF NUMERAL REFERENCES

1: Exhaust gas purifying catalyst; 2: substrate; 3: catalyst layer; 4: upstream catalyst layer; 5: downstream catalyst layer; 6: lower catalyst layer; 7: upper catalyst layer All publications, patents, and patent applications cited herein are incorporated herein by reference in their entirety.

The invention claimed is:

1. An exhaust gas purifying catalyst comprising a substrate and a catalyst layer provided on the substrate, wherein
the catalyst layer comprises a lower catalyst layer comprising an upstream catalyst layer and a downstream catalyst layer,
the upstream catalyst layer is located on an upstream side of the downstream catalyst layer in terms of the exhaust gas flow direction,
the upstream catalyst layer comprises platinum and/or palladium, and
the downstream catalyst layer comprises vanadium.

2. The exhaust gas purifying catalyst according to claim 1, wherein
the catalyst layer further comprises an upper catalyst layer provided on the lower catalyst layer, and
the upper catalyst layer comprises rhodium.

3. The exhaust gas purifying catalyst according to claim 1, wherein the catalyst layer further comprises rhodium.

4. The exhaust gas purifying catalyst according to claim 2, wherein
the lower catalyst layer is provided on the substrate, and the upper catalyst layer is provided on the lower catalyst layer.

* * * * *